April 28, 1959    J. R. WILLIAMS    2,884,118
ARTICULAR CONVEYOR CHAIN
Filed April 22, 1957
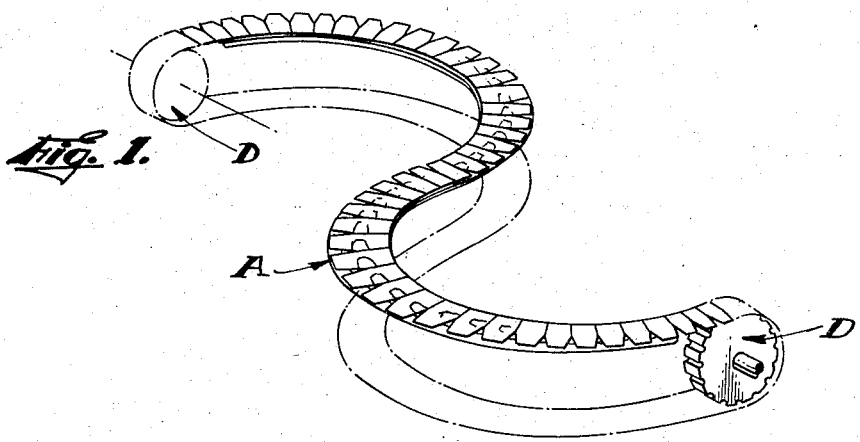
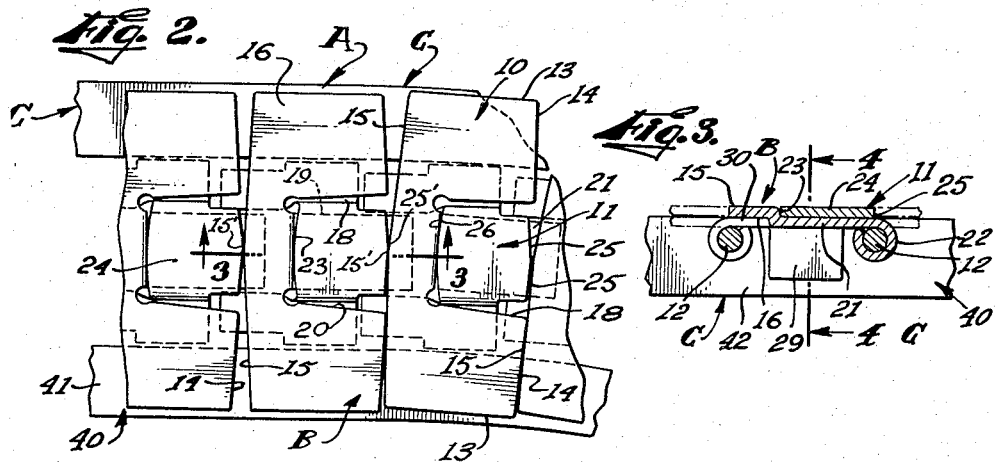
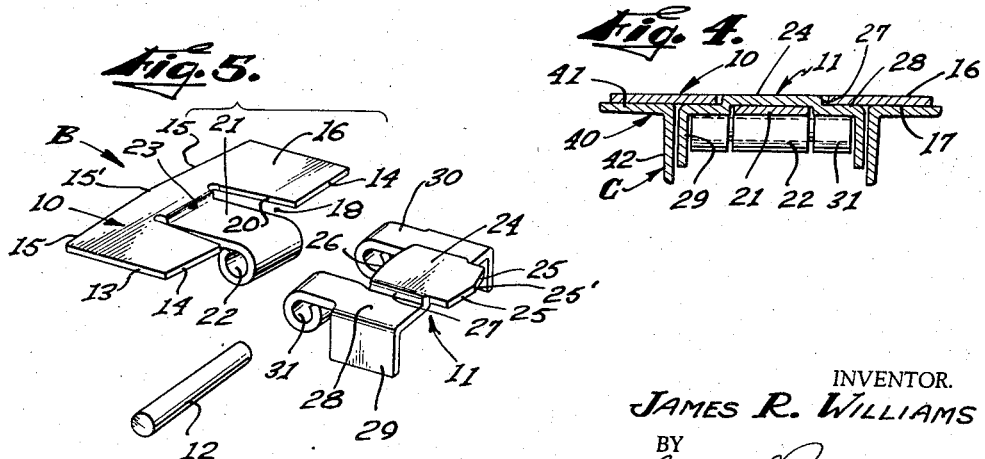
INVENTOR.
JAMES R. WILLIAMS
BY
AGENT ated Apr. 28, 1959

2,884,118

ARTICULAR CONVEYOR CHAIN

James R. Williams, Canoga Park, Calif.

Application April 22, 1957, Serial No. 654,167

10 Claims. (Cl. 198—189)

This invention relates to a conveyor chain and is more particularly concerned with an endless articular conveyor chain for supporting and transporting various articles through a predetermined path and such that it can run or travel around arcs or radii in both horizontal and vertical planes.

Endless conveyor belts, chains and the like, are employed extensively in transporting various objects through various stations in production lines. The ordinary conveyor chain or belt is such that it can only travel in a straight line, with the result that when it is desired to change or vary the direction in which the article is traveling, a new or different conveyor must be provided and a suitable transferring mechanism, such as a rotating disc or table must be engaged between the adjacent discharge and receiving ends of related conveyors.

In the past, attempts have been made to provide articulated conveyors that is, conveyor chains or belts that can turn and carry the products being handled, around corners, or the like. To date, such constructions have only met with limited success and have only partially achieved the end sought. That is, while conveyor chains have been provided which will turn corners, they still require or must be supplemented with transfer means where the direction in which they are traveling is changed and/or must be provided with supplemental horizontally disposed sprockets, and the like, at the corners to prevent them from binding and shifting out of position.

An object of the present invention is to provide an endless conveyor chain adapted to travel around corners and turns, without the need of special transfer means and/or special guiding and driving sprockets, and the like.

Another object of my invention is to provide a conveyor chain of the character referred to including articulated link units, each of which establishes a flat, unobstructed, work-supporting surface or top.

A further object of the present invention is to provide an articulated conveyor chain of the character referred to, which chain is adapted to be supported and guided by a pair of laterally spaced, parallel rails and a chain which is not subject to binding or becoming displaced from the rails when it is directed around corners by the rails.

It is still another object of the present invention to provide an articular conveyor chain of the character referred to which involves a limited number of parts, each of which is both easy and economical of manufacture, and a construction which is both highly effective and dependable in operation.

The articular conveyor chain that I provide involves generally, a plurality of like articulated units arranged in end-to-end relationship and each including a platform link, a guide link pivotally engaged with the platform link and a link pin carried by each guide link and pivotally engaging the platform link of the next or adjacent unit. The construction further includes a pair of elongate parallel rails adapted to cooperatively receive and support the guide and platform links of the several units going to make up the chain.

A further object of the present invention is to provide a conveyor chain of the character referred to wherein the guide links of the several units are provided with parts to cooperate with the rails and with sprockets around which the chain is engaged, to guide the chain and prevent displacement of the chain from the rails and sprockets.

The various objects and features of my invention will be fully understood from the following detailed description of a typical preferred form and application of my invention, throughout which description reference is made to the accompanying drawings, in which:

Fig. 1 is a diagrammatic perspective view showing the conveyor chain provided by the present invention and one manner or course in which it can be caused to run.

Fig. 2 is an elevational plan view of a portion of the construction provided by the present invention.

Fig. 3 is a transverse sectional view of my construction and taken as indicated by line 3—3 on Fig. 2.

Fig. 4 is a transverse sectional view taken as indicated by line 4—4 on Fig. 3.

Fig. 5 is an exploded view showing the three elements or parts which go to make up one unit of my conveyor chain construction.

This invention relates to an articular conveyor chain A and involves generally, a plurality of articulated chain units B, pivotally connected to each other to establish an endless chain, and a track C adapted to support and guide the chain. The construction further includes a pair of sprockets D around which the chain is guided and which serve to drive the chain along the track.

Each unit B of the chain that I provide is shown as including a platform link 10, a guide link 11 engaged with the platform link, and a link pin 12 carried by the guide link and adapted to engage and pivotally connect the unit with the platform link of the next or adjacent unit in the chain.

The platform link 10 of each unit B is a substantially flat, horizontally disposed plate-like member formed of sheet metal and is characterized by straight, parallel side edges 13, a pair of forwardly convergent front edges 14, a pair of rearwardly convergent rear edges 15, and flat top and bottom surfaces 16 and 17. The pair of rear edges 15 converge at a point along the central longitudinal axis of the plate to establish a rear central bearing point 15'.

The link 10 further includes a pair of laterally spaced notches 18, which extend rearwardly into the plate from the front edges 14 thereof. The notches 18 are of substantial lateral extent and have straight, parallel inner side edges 19 and pitched or laterally outwardly inclined outer side edges 20. The outer edges 20 of the notches 18 are pitched or inclined about 5° to the central longitudinal axis of the link. The inner side edges 19 of the notches 18 cooperate to define a flat, central, forwardly projecting tongue 21. The tongue 21 projects beyond the front edges 14 of the link and is downwardly offset from the plane of the link, as clearly illustrated throughout the drawings. The forward end portion of the tongue 21 is turned or rolled downwardly and rearwardly to establish a laterally disposed bearing 22, which bearing is offset below the plane of the tongue and is adapted to receive a link pin 12, as will hereinafter be described.

The base of the tongue 21, that is, the portion of the tongue which joins the tongue with the remainder of the link 10, establishes a straight, laterally disposed forwardly facing bearing shoulder 23, which shoulder extends between the bottoms of the notches 18. In the preferred carrying out of the invention, the tongue 21 is offset downwardly a distance equal to that of the thickness of the stock from which the link is formed and cooperates with the outer side edges 20 of the notches to establish an upwardly and forwardly opening recess in which a portion of the guide link 11 is engaged, as will hereinafter be described.

The guide link 11 is a substantially U-shaped member formed of sheet metal and is shown as including, a flat, horizontally disposed head portion 24 with a pair of forwardly convergent front edges 25, an arcuate rear edge 26, and straight parallel side edges 27. The guide link 11 further includes flat, horizontally disposed wings 28 projecting laterally from the side edges of the head portion 24 and flat, vertically disposed and laterally spaced guide plates 29 depending from the outer ends of the wings.

In addition to the foregoing, the guide link 11 further includes, a tongue-like extension 30 on each wing 28 to project rearwardly therefrom. The rear terminal end portions of the extensions 30 are turned or rolled downwardly and forwardly to establish laterally disposed bearings 31 which occur below the plane of the wings and are adapted to cooperatively receive a link pin 12, as will hereinafter be described.

The head portion 24 of the guide link 11 is slightly greater in lateral extent than the tongue 21 of the platform link 10 and is slightly less in lateral exent than the recess defined by the tongue and the opposing outer side edges 20 of the notches 18 in the platform link.

The guide link is related to the platform link 10 so that the head portion 24 thereof engages and rests on the top surface of the tongue 21 and so that the side edges 27 of the head portion 24 of the guide link normally occur in opposed spaced relationship with the outer side edges 20 of the notches.

The arcuate rear edge 26 of the head portion 24 of the guide link is curved about an axis spaced forwardly of the head and is adapted to establish point bearing engagement with the straight forwardly disposed bearing shoulder 23 of the platform link 10. The pair of forwardly convergent front edges 25 of the head portion 24 converge at a point along the central longitudinal axis of the guide link and establish a front bearing point 25', adapted to cooperatively engage the rear central bearing point 15' of the platform link 10 of the next or adjacent chain unit B related thereto.

The wings 28 of the guide links 11 are downwardly offset from the plane of the head portion 24 to project through the notches 18 in the platform links 10 to which they are related and to occur adjacent the bottom surface 17 of the platform links, as clearly illustrated in the drawings. The wings 28 are of limited lateral extent and occur under the portions of the platform links adjacent the notches 18.

The guide plates 29 of the guide links 11 are simple, vertically disposed, tab-like members formed on the outer ends of the wings 28 to depend from the bottom surfaces of the links 10 and 11 of the units in lateral spaced relationship to each other and are adapted to cooperate with the track C and the sprockets D in a manner that will hereinafter be described.

The tongue 21 on the platform link of each unit B projects forwardly from the unit to a position between the tongue-like extensions 30 on the guide link 11 of the preceding unit B of the chain and so that the bearings 22 and 31 thereof are in axial alignment. A link pin 12 is engaged through the related bearings 22 and 31 to positively couple the units B together. In the preferred carrying out of the invention, the link pins 12 establish a snug fit in the bearings 31 of the guide links 11 and establish sliding bearing engagement in the bearings 22 of the platform link 10. With this relationship of parts, it will be apparent that the units B when coupled together are free to pivot in a vertical plan relative to each other and around the sprockets D.

When the links 10 and 11 of each unit B are engaged in the manner set forth above, it will be apparent that the head portion 24 of the guide link 11 is free to pivot horizontally in the recess and relative to the tongue 21 of the platform link and that the rear edge 26 on the head portion of the guide link rolls or rocks along the forwardly disposed bearing shoulder of the platform link. It will be further apparent that when several units B are engaged in the manner set forth above, and the chain is drawn and put in tension, the forwardly disposed bearing shoulders 23 of the platform links, which links are coupled to the guide link of each preceding or leading unit by a link pin, establish driving bearing engagement on the arcuate rear edges 26 on the heads 24 of the guide links.

It will be further apparent that the forwardly convergent front edges 14 of the platform link and the forwardly convergent edges 25 of the guide link of each unit oppose the rearwardly convergent rear edges 15 of the preceding or leading unit B of the chain. With this relationship of parts and when the chain is directed around a corner and the links of each unit are pivoted relative to each other, it will be apparent that the opposing edges of adjacent units are suitably relieved to permit free horizontal pivoting of the adjacent units relative to each other.

The track C provided by the present invention is shown as including a pair of laterally spaced, parallel rails 40 adapted to occur below and slidably support the platform links 10 of the chain and to occur at opposite sides of the guide links 11 and slidably engage the guide plates 29 of the guide links. In the particular case illustrated, the rails 40 are formed of angle-iron and each is shown as having a flat, horizontally disposed top flange 41 to engage and support the platform links 10 of the chain and a vertically disposed downwardly projecting side flange 42 to engage and guide the guide plates 29 on the guide links 11 of the chain. In practice, the manner in which the rails 40 of the track C are supported and the manner in which they are bent or formed can vary widely as circumstances require and since the manner in which the rails are supported and are formed does not affect the novelty of the present invention, I will dispense with further detailed description thereof.

It will be apparent that the platform and guide links of the present construction could be advantageously molded of a plastic material such as nylon. Such a construction or choice of material would establish a conveyor particularly adapted for use in situations where highly corrosive materials are being handled and in situations where the generation of static electric charges must be avoided.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A conveyor element comprising, a plurality of like parallel units, each unit including, a flat horizontally disposed platform link with front, rear and side edges, a forwardly opening recess in the front edge, a downwardly offset tongue projecting forwardly from the recess and a laterally disposed pin receiving bearing at the forward end of the tongue; a guide link with a central head portion positioned in the recess in the platform link above the tongue, wings projecting laterally from the head portion of the guide link to occur below the platform link, rearwardly projecting extensions on the wings to project rearwardly from the platform link, and laterally disposed and axially aligned pin receiving bearings on the rear ends of the extension, and a link pin carried by the bearings on the extension and adapted to be engaged through the bearing on the tongue of a like conveyor element located adjacent the rear of the unit.

2. A conveyor element comprising, a plurality of like parallel units, each unit including, a flat horizontally disposed platform link with front, rear and side edges, a forwardly opening recess in the front edges, a tongue projecting forwardly from the recess and downwardly offset from the plane of the link, and a downwardly offset laterally disposed pin receiving bearing at the forward end of the tongue, a guide link with a central head portion positioned in the recess in the platform link above the tongue, downwardly offset wings projecting laterally from the head portion of the guide link to occur below the platform link, rearwardly projecting extensions on the wings to project rearwardly from the platform link, and downwardly offset laterally disposed and axially aligned pin receiving bearings on the rear ends of the extensions, and a link pin carried by the bearing on the extensions and adapted to be engaged through the bearing on the tongue of a like conveyor element located adjacent the rear of the unit.

3. A conveyor element comprising, a plurality of like parallel units, each unit including, a flat horizontally disposed platform link with front, rear and side edges, a forwardly opening recess in the link having a straight forwardly disposed bottom extending transversely of the link and forwardly and laterally outwardly inclined sides, a flat, horizontally disposed, and downwardly offset tongue projecting forwardly from the bottom of the recess and a laterally disposed pin receiving bearing at the forward end of the tongue, a guide link with a central head portion positioned in the recess in the platform link above the tongue and having an arcuate rear edge engaging the bottom of the recess, wings projecting laterally from the head portion of the guide link to occur below the platform link, rearwardly projecting extensions on the wings to project rearwardly from the platform link, and laterally disposed and axially aligned pin receiving bearings on the rear ends of the extensions, and a link pin carried by the bearing on the extensions and adapted to be engaged through the bearing on the tongue of a like conveyor element located adjacent the rear of the unit.

4. A conveyor element comprising, a plurality of like parallel units, each unit including, a flat horizontally disposed platform link with front, rear and side edges, a forwardly opening recess in the link having a straight forwardly disposed bottom extending transversely of the link and forwardly and laterally outwardly inclined sides, a flat, horizontally disposed tongue projecting forwardly from the bottom of the recess and downwardly offset from the plane of the link and a downwardly offset laterally disposed pin receiving bearing at the forward end of the tongue, a link with a central head portion positioned in the recess in the platform link above the tongue and having an arcuate rear edge engaging the bottom of the recess, downwardly offset wings projecting laterally from the head portion of the guide link to occur below the platform link, rearwardly projecting extensions on the wings to project rearwardly from the platform link, and downwardly offset laterally disposed and axially aligned pin receiving bearings on the rear ends of the extensions, and a link pin carried by the bearing on the extensions and adapted to be engaged through the bearing on the tongue of a like conveyor element positioned adjacent the rear of the unit.

5. A conveyor element comprising, a plurality of like parallel units, each unit including, a flat horizontally disposed platform link with a pair of forwardly convergent front edges, a pair of rearwardly convergent rear edges and parallel side edges, a forwardly opening recess in the front edge, a tongue projecting forwardly from the recess and downwardly offset from the plane of the link and a laterally disposed pin receiving bearing at the forward end of the tongue, a guide link with a central head portion to occur in the recess in the platform link above the tongue, wings projecting laterally from the head portion of the guide link positioned below the platform link, rearwardly projecting extensions on the wings to project rearwardly from the platform link, and laterally disposed and axially aligned pin receiving bearings on the rear ends of the extensions, and a link pin carried by the bearings on the extensions and adapted to be engaged through the bearing on the tongue of a like conveyor element located adjacent the rear of the unit, the forwardly convergent front edges of the platform link of the said adjacent unit opposing the rearwardly convergent rear edges of the platform link.

6. An elongate conveyor element adapted to be engaged about a sprocket wheel and drawn along tracks comprising, a plurality of like parallel units, each unit including, a flat horizontally disposed platform link with front, rear and side edges, a forwardly opening recess in the front edges, a tongue projecting forwardly from the recess and downwardly offset from the plane of the link, and a downwardly offset laterally disposed pin receiving bearing at the forward end of the tongue, a guide link with a central head portion to occur in the recess in the platform link above the tongue, downwardly offset wings projecting laterally from the head portion of the guide link positioned below the platform link, flat vertically disposed guide plates depending from the outer ends of the wings to occur in spaced relationship to each other and adapted to cooperatively engage the tracks and sprocket wheels, rearwardly projecting extensions on the wings to project rearwardly from the platform link, and downwardly offset laterally disposed and axially aligned pin receiving bearings on the rear ends of the extensions, and a link pin carried by the bearing on the extensions and adapted to be engaged through the bearing on the tongue of a like conveyor element located adjacent the rear of the unit.

7. A conveyor element comprising, a plurality of like parallel units, each unit including, a flat horizontally disposed platform link with front, rear and side edges, a central forwardly opening recess in the link having a straight forwardly facing bottom extending transversely of the link and forwardly and laterally outwardly divergent sides, a flat, horizontally disposed, elongated tongue projecting forwardly from the bottom of the recess, and a laterally disposed pin receiving bearing at the forward end of the tongue and downwardly offset from the plane of the link, a guide link including a central head portion engaging the top of the tongue and having an arcuate rear edge opposing and bearing on the bottom of the recess, straight parallel side edges spaced from and opposing the sides of the recess, a pair of flat horizontally disposed wings projecting laterally from the head portion of the guide link positioned below the platform link, laterally spaced and vertically disposed guide plates depending from the outer ends of the wings, a rearwardly projecting extension on each wing to project rearwardly from the platform link, and axially aligned laterally disposed pin receiving bearings at the rear ends of the extensions to occur at opposite sides of and in axial alignment with the bearing on the tongue of an adjacent platform link, and a link pin engaged in said axially aligned bearings to pivotally connect the platform link of each unit to the guide link of each preceding unit.

8. A conveyor element comprising, a plurality of like, parallel units, each unit including, a flat horizontally disposed platform link with straight parallel side edges, a pair of forwardly convergent front edges, a central forwardly opening recess in the link having a straight forwardly facing bottom extending transversely of the link and forwardly and laterally outwardly divergent sides, a flat, horizontally disposed elongated tongue projecting forwardly from the bottom of the recess and downwardly offset from the plane of the link, and a laterally disposed pin receiving bearing at the forward end of the tongue, a guide link including a central head portion engaging the top of the tongue and having an arcuate rear edge opposing and bearing on the bottom of the recess, straight parallel side edges spaced from and opposing the sides of the recess and a pair of forwardly convergent front edges adapted to align with the front edges of the platform link when the links are rotated relative to each other, a pair of flat, horizontally disposed wings downwardly offset from and projecting laterally from the head portion of the guide link positioned below the platform link, laterally spaced and vertically disposed guide plates depending from the outer ends of the wings, a rearwardly projecting extension on each wing to project rearwardly from the rear edge of the platform link, and axially aligned laterally disposed pin receiving bearings at the rear ends of the extension positioned at opposite sides of and in axial alignment with the bearing on the tongue of an adjacent platform link, and a link pin engaged in said axially aligned bearings to pivotally connect the platform link of each unit to the guide link of each preceding unit.

9. An elongate articulated conveyor element adapted to engage and be guided by a pair of laterally spaced rails having parallel top edges and around notched sprocket wheels adjacent the ends of the rails comprising, a plurality of like, parallel units, each unit including, a flat horizontally disposed platform link having a flat, rail engaging bottom surface, straight parallel side edges, a pair of forwardly convergent front edges, a central forwardly opening recess in the link having a straight forwardly facing bottom extending transversely of the link and forwardly and laterally outwardly divergent sides, a flat, horizontally disposed elongated tongue and projecting forwardly from the bottom of the recess and downwardly offset from the plane of the link, and a downwardly offset laterally disposed pin receiving bearing at the forward end of the tongue, said link being adapted to slidably engage the top edges of the rails, a guide link including a central head portion engaging the top of the tongue and having an arcuate rear edge opposing and bearing on the bottom of the recess, straight parallel side edges spaced from and opposing the sides of the recess and a pair of forwardly convergent front edges in alignment with the front edges of the platform link, a pair of flat horizontally disposed wings downwardly offset from and projecting laterally from the head portion of the guide link positioned below the platform link, laterally spaced and vertically disposed guide plates depending from the outer ends of the wings and adapted to occur between and slidably engage the rails and to occur at opposite sides of the sprocket wheels, a rearwardly projecting extension on each wing to project rearwardly from the rear edge of the platform link, and axially aligned downwardly offset and laterally disposed pin receiving bearings at the rear ends of the extension positioned at opposite sides of and in axial alignment with the bearing on the tongue of an adjacent platform link, and a link pin engaged in said axially aligned bearings to pivotally connect the platform link of each unit to the guide link of each preceding unit.

10. An elongate articulated conveyor element comprising adapted to engage and be guided by a pair of laterally spaced rails with parallel top edges, a plurality of like parallel units, each unit including, a flat horizontally disposed platform link having a flat rail engaging bottom surface straight parallel side edges, a pair of forwardly convergent front edges, a flat work supporting top surface and a flat rail engaging bottom surface, a central forwardly and upwardly opening recess in the link having a straight forwardly facing bottom extending transversely of the link and forwardly and laterally outwardly divergent sides, a flat, horizontally disposed elongated tongue projecting forwardly from the bottom of the recess and downwardly offset from the plate of the link, and a downwardly offset laterally disposed pin receiving and sprocket engaging bearing at the forward end of the tongue, said link being adapted to slidably engage the top edges of the rails, a guide link including a central head portion engaging the top of the tongue and having an arcuate rear edge opposing and bearing on the bottom of the recess, straight parallel side edges spaced from and opposing the sides of the recess, a pair of forwardly convergent front edges in alignment with the front edges of the platform link and a flat work supporting top surface flush with the top surface of the platform link, a pair of flat horizontally disposed wings downwardly offset from and projecting laterally from the head portion of the guide link positioned below the platform link, laterally spaced and vertically disposed guide plates depending from the outer ends of the wings and adapted to be positioned between and slidably engage the rails, a rearwardly projecting extension on each wing to project rearwardly from the rear edge of the platform link, and axially aligned downwardly offset and laterally disposed sprocket engaging and pin receiving bearings at the rear ends of the extension positioned at opposite sides of and in axial alignment with the bearing on the tongue of an adjacent platform link, and a link pin engaged in said axially aligned bearings to pivotally connect the platform link of each unit to the guide link of each preceding unit.

References Cited in the file of this patent

UNITED STATES PATENTS

| 2,569,636 | Imse | Oct. 2, 1951 |

FOREIGN PATENTS

| 276,851 | Italy | Aug. 20, 1930 |